(12) United States Patent
Arnold et al.

(10) Patent No.: US 12,055,520 B2
(45) Date of Patent: Aug. 6, 2024

(54) METHODS AND SYSTEMS FOR INSPECTING FASTENED STRUCTURES

(71) Applicant: The Boeing Company, Chicago, IL (US)

(72) Inventors: David W. Arnold, Newcastle, WA (US); Samuel R. Goertz, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 264 days.

(21) Appl. No.: 17/568,847

(22) Filed: Jan. 5, 2022

(65) Prior Publication Data

US 2023/0213484 A1 Jul. 6, 2023

(51) Int. Cl.
| | |
|---|---|
| *G01N 29/12* | (2006.01) |
| *G01N 29/44* | (2006.01) |
| *G01N 29/48* | (2006.01) |

(52) U.S. Cl.
CPC ......... *G01N 29/12* (2013.01); *G01N 29/4427* (2013.01); *G01N 29/48* (2013.01); *G01N 2291/014* (2013.01)

(58) Field of Classification Search
CPC .... G01N 29/12; G01N 29/4427; G01N 29/48; G01N 2291/014; G01N 2291/2691; G01N 29/42; G01N 29/4436; G01N 29/348; G01N 29/043; G01N 29/11; G01N 29/223

See application file for complete search history.

(56) References Cited

U.S. PATENT DOCUMENTS

| | | | | |
|---|---|---|---|---|
| 4,062,227 | A | * 12/1977 | Heyman | G01B 17/04 73/761 |
| 9,032,602 | B2 | 5/2015 | Woods et al. | |
| 2002/0148293 | A1 * | 10/2002 | Little | G01N 29/348 73/579 |

* cited by examiner

*Primary Examiner* — Xin Y Zhong
(74) *Attorney, Agent, or Firm* — Walters & Wasylyna LLC

(57) ABSTRACT

A method for inspecting a fastened structure, the fastened structure having at least one structural member defining a bore therein and a mechanical fastener received in the bore, includes applying acoustic energy to the fastened structure, the acoustic energy being applied over a plurality of frequencies, measuring a response of the fastened structure across at least two frequencies of the plurality of frequencies, and comparing the response of the fastened structure at the at least two frequencies of the plurality of frequencies to predefined values for the at least two frequencies of the plurality of frequencies to determine whether an out-of-tolerance condition is present.

20 Claims, 5 Drawing Sheets

METHODS AND SYSTEMS FOR INSPECTING FASTENED STRUCTURES

FIELD

This relates generally to inspection of materials and, more particularly, to methods and systems for inspecting fastened structures.

BACKGROUND

Fastened structures require inspection after extended periods of use. Current standard operating procedures for inspecting fastened structures typically involve removal of fasteners to visibly inspect for potential defects, such as pilot hole defects. Thus, current methodology and procedures result in increased labor costs, are inefficient, increased chance of injury to personnel, and may be inaccurate due to user errors.

Accordingly, those skilled in the art continue research and development in the field of inspecting fastened structures.

SUMMARY

The following is a non-exhaustive list of examples, which may or may not be claimed, of the subject matter according to the present disclosure Disclosed is a method for inspecting a fastened structure, the fastened structure having at least one structural member defining a bore therein and a mechanical fastener received in the bore.

In an example, the method includes applying acoustic energy to the fastened structure, the acoustic energy being applied over a plurality of frequencies, measuring a response of the fastened structure across at least two frequencies of the plurality of frequencies, and comparing the response of the fastened structure at the at least two frequencies of the plurality of frequencies to predefined values for the at least two frequencies of the plurality of frequencies to determine whether an out-of-tolerance condition is present.

Also disclosed is a method for inspecting a fastened structure, the fastened structure having at least one structural member defining a bore therein and a mechanical fastener received in the bore.

In an example, the method includes acoustically coupling a mechanical impedance analysis probe with the mechanical fastener of the fastened structure to apply acoustic energy to the mechanical fastener, the acoustic energy being applied at a plurality of frequencies ranging from about 30 kHz to about 250 kHz. The method further includes measuring an amplitude response of the mechanical fastener at the plurality of frequencies. The method further includes comparing the amplitude response of the mechanical fastener at the plurality of frequencies to predefined values for the plurality of frequencies to determine whether an out-of-tolerance condition is present.

Also disclosed is a system for inspecting a fastened structure, the fastened structure having at least one structural member defining a bore therein and a mechanical fastener received in the bore.

In an example, the system includes an ultrasound transducer configured to apply acoustic energy to the fastened structure over a plurality of frequencies and measure a response of the fastened structure to the plurality of frequencies. The system further includes a processor in communication with the ultrasound transducer, the processor being configured to compare the response of the fastened structure to the plurality of frequencies to predefined values for the plurality of frequencies to determine whether an out-of-tolerance condition is present.

BRIEF DESCRIPTION OF THE DRAWINGS

FIG. 4b is a cross-sectional side view of the fastened structure of FIG. 4a;

DETAILED DESCRIPTION

Figure 1:
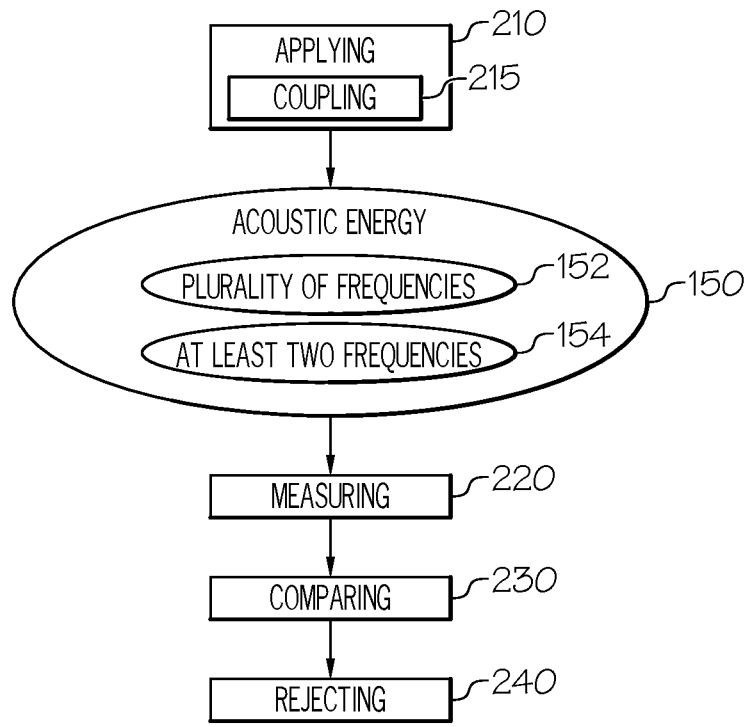
FIG. 1 is a flowchart of a method for inspecting a fastened structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "an example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIG. 1, disclosed is a method 200 for inspecting a fastened structure 120. The method 200 may be useful for inspecting both pilot holes and fastener holes after being drilled to ensure a proper fit of a mechanical fastener 160 in the fastened structured 120. An improper fit may be prevented by the method 200 detecting defective pilot holes, proper torque of the mechanical fastener 160, and cracks present around the mechanical fastener 160.

Figure 3:
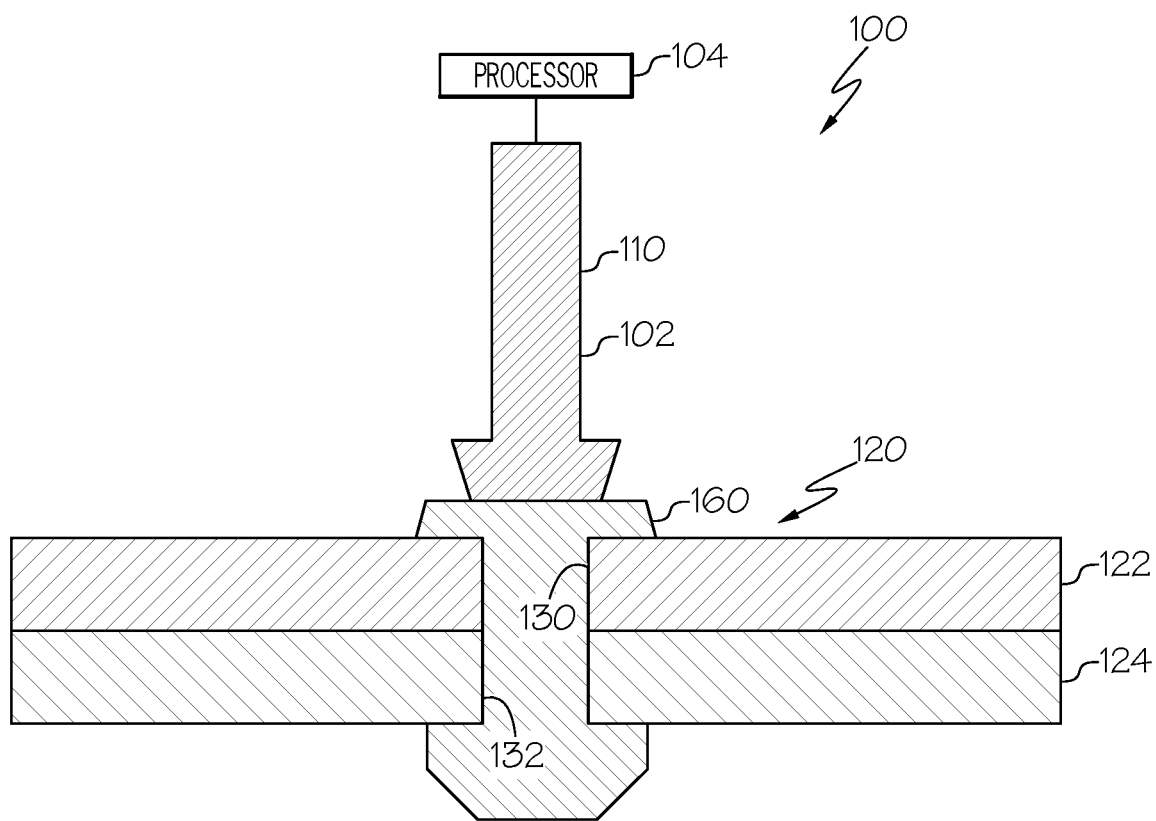
FIG. 3 is a cross-sectional schematic of a system for inspecting a fastened structure.

The fastened structure 120 includes at least one structural member 122 defining a bore 130 therein and a mechanical fastener 160 received in the bore 130, see FIG. 3. The structural member 122 of the fastened structure 120 may include at least one of a metallic material and a composite material.

The fastened structure 120 may further include a second structural member 124 defining a second bore 132 therein and the mechanical fastener 160 may be received in the second bore 132. The second structural member 124 of the fastened structure 120 may include at least one of a metallic material and a composite material. In one example, the structural member 122 of the fastened structure 120 and the second structural member 124 of the fastened structure 120 are compositionally alike. In another example, the structural member 122 of the fastened structure 120 and the second structural member 124 of the fastened structure 120 are compositionally different.

The mechanical fastener 160 of the fastened structure 120 may include at least one of a bolt, a screw, and a rivet. In one example, the mechanical fastener 160 of the fastened structure 120 comprises a metallic material. In another example, the mechanical fastener 160 of the fastened structure 120 comprises a material that is compositionally the same as at least one of the structural member 122 of the fastened structure 120 and the second structural member 124 of the fastened structure 120. In yet another example, the mechanical fastener 160 of the fastened structure is compositionally the same as both the structural member 122 of the fastened structure 120 and the second structural member 124 of the fastened structure 120.

Figure 5:
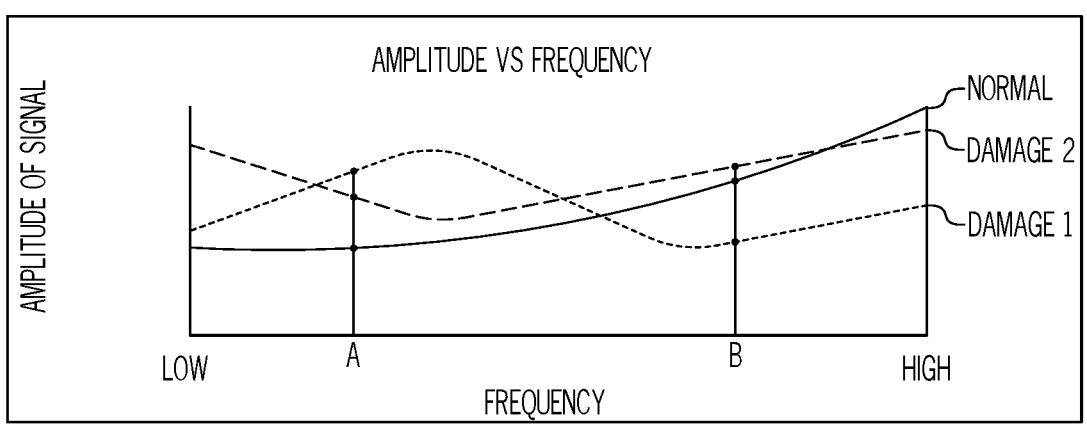
FIG. 5 is a graph of amplitude versus frequency depicting two different out-of-tolerance conditions compared to a normal condition.

Still referring to FIG. 1, in one or more examples, the method 200 includes applying 210 acoustic energy 150 to the fastened structure 120, the acoustic energy 150 being applied over a plurality of frequencies 152. The plurality of frequencies 152 may range from low to high frequencies, as shown in FIG. 5. In one example, the plurality of frequencies 152 may range from 30 kHz to about 1 MHz.

In one example, the applying 210 the acoustic energy 150 to the fastened structure 120 includes applying the acoustic energy 150 to the mechanical fastener 160. In another example, the applying 210 the acoustic energy 150 to the fastened structure 120 includes acoustically coupling 215 a mechanical impedance analysis probe 110 with the fastened structure 120. In yet another example, the applying 210 the acoustic energy 150 to the fastened structure 120 induces acoustic resonance within the mechanical fastener 160.

The applying 210 acoustic energy 150 to the fastened structure 120 may be performed at various frequency ranges. In one example, the applying 210 the acoustic energy 150 to the fastened structure 120 includes applying the acoustic energy 150 at a frequency ranging from about 30 kHz to about 1 MHz. In another example, the applying the acoustic energy 150 to the fastened structure 120 includes applying the acoustic energy 150 at a frequency ranging from about 30 kHz to about 250 kHz.

The method 200 further includes measuring 220 a response of the fastened structure 120 across at least two frequencies 154 of the plurality of frequencies 152, for example at frequency A and at frequency B of FIG. 5. In one example, the measuring 220 the response of the fastened structure 120 comprises measuring an amplitude response of the fastened structure 120 to the acoustic energy 150. In another example, the measuring 220 the response of the fastened structure 120 comprises measuring a phase response of the fastened structure 120 to the acoustic energy 150.

In one or more examples, the measuring 220 the response of the fastened structure 120 includes measuring the response of the fastened structure 120 at each frequency of the plurality of frequencies 152. In one example, the frequency ranges from about 30 kHz to about 1 MHz. In another example, frequency ranges from about 30 kHz to about 250 kHz.

FIG. 5 graphically depicts amplitude versus frequency for two possible/theoretical out-of-tolerance conditions, Damage 1 and Damage 2, as well as a control, or Normal condition, for an ideal or normal fastened structure 120 that is properly aligned and fastened together via mechanical fastener 160. The out-of-tolerance conditions, Damage 1 and Damage 2, might be mismatched holes, an out-of-round condition, a crack, or the like.

In one or more examples, both the applying 210 the acoustic energy 150 to the fastened structure 120 and the measuring 220 the response of the fastened structure 120 are performed by a mechanical impedance analysis probe 110 acoustically coupled with the fastened structure 120. The mechanical impedance analysis probe 110 may be any standard impedance analysis probe 110.

Still referring to FIG. 1, the method 200 further includes comparing 230 the response of the fastened structure 120 at the at least two frequencies 154, such as frequency A and frequency B of FIG. 5, of the plurality of frequencies 152 to predefined values for the at least two frequencies 154 of the plurality of frequencies 152 to determine whether an out-of-tolerance condition is present. For example, an out-of-tolerance condition may be discovered due to changes in resonance frequency of the mechanical fastener 160, see FIG. 5.

In one example, the comparing 230 the response of the fastened structure 120 includes comparing 230 the response of the fastened structure 120 at each frequency of the plurality of frequencies 152 to predefined values for each frequency of the plurality of frequencies 152. As illustrated in FIG. 5, different out-of-tolerance conditions yield different patterns of amplitude versus frequency across the structures of fastened structure 120.

In one or mor examples, an out-of-tolerance condition is present when a difference between the response of the fastened structure 120 at any of the at least two frequencies 154 of the plurality of frequencies 152 and the predefined values for the at least two frequencies 154 of the plurality of frequencies 152 exceeds a threshold. For example, a crack in the fastened structure 120 may have a different resonance frequency than a defective pilot hole or other defect present in the fastened structure 120, as shown in FIG. 5.

Still referring to FIG. 1, the method 200 further includes rejecting 240 the fastened structure 120 when the out-of-tolerance condition is present. The rejecting 240 may be automated by a processor 104 configured to compare the response of the fastened structure 120 to the plurality of frequencies 152 to predefined values for the plurality of frequencies 152 to determine whether an out-of-tolerance condition is present.

In one or more examples, the fastened structure 120 comprises at least two structural members, at least one structural member 122 and second structural member 124. In one example, the structural member 122 of the at least two structural members, at least one structural member 122 and second structural member 124, defines a bore 130 and the second structural member 124 of the at least two structural members, at least one structural member 122 and second structural member 124, defines a second bore 132. In an example, the mechanical fastener 160 is received in both the bore 130 of the at least one structural member 122 and the second bore 132 of the second structural member 124.

Figure 2:
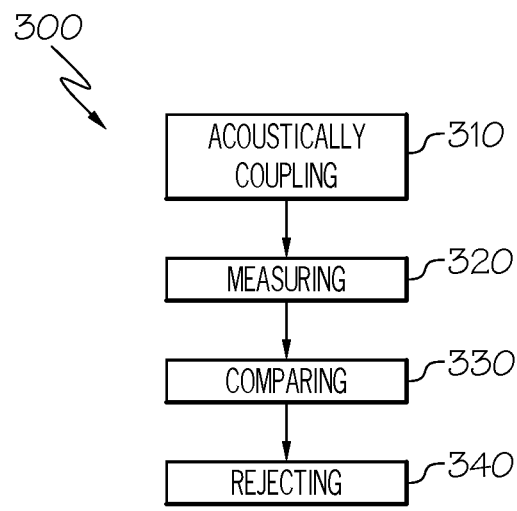
FIG. 2 is a flowchart of a method for inspecting a fastened structure

Referring to FIG. 2, a method 300 for inspecting a fastened structure 120 is disclosed. The fastened structure 120 includes at least one structural member 122 defining a bore 130 therein and a mechanical fastener 160 received in the bore 130, see FIG. 3.

The fastened structure 120 may further include a second structure member 124 defining a second bore 132 therein and the mechanical fastener 160 may be received in the second bore 132. The structural member 122 of the fastened structure 120 may include at least one of a metallic material and a composite material. Further, the second structural member 124 of the fastened structure 120 may include at least one of a metallic material and a composite material. In one example, the structural member 122 of the fastened structure 120 and the second structural member 124 of the fastened structure 120 are compositionally alike. In another example, the structural member 122 of the fastened structure 120 and the second structural member 124 of the fastened structure 120 are compositionally different.

The mechanical fastener 160 of the fastened structure 120 may include at least one of a bolt, a screw, and a rivet. In one example, the mechanical fastener 160 of the fastened structure 120 comprises a metallic material. In another example, the mechanical fastener 160 and the at least one structural member 122 comprise metallic materials. In another example, the mechanical fastener 160 of the fastened structure 120 comprises a material that is compositionally the same as at least one of the structural member 122 of the fastened structure 120 and the second structural member 124 of the fastened structure 120. In yet another example, the mechanical fastener 160 of the fastened structure is compositionally the same as both the structural member 122 of the fastened structure 120 and the second structural member 124 of the fastened structure 120.

Referring to FIG. 2, in one or more examples, the method 300 includes acoustically coupling 310 a mechanical impedance analysis probe 110 with the mechanical fastener 160 of the fastened structure 120 to apply acoustic energy 150 to the mechanical fastener 160. In one example, the acoustic energy 150 is applied at a plurality of frequencies 152 ranging from about 30 kHz to about 250 kHz.

Still referring to FIG. 2, the method 300 includes measuring 320 an amplitude response of the mechanical fastener 160 at the plurality of frequencies 152. The measuring 320 may include measuring 320 an amplitude response of the mechanical fastener 160 to acoustic energy 150 being applied at a plurality of frequencies 152 ranging from about 30 kHz to about 250 kHz. The amplitude response may change when an out-of-tolerance condition is present. An out-of-tolerance condition may be present, for example, when the fastener 160 is not centered in the bore 130 and the second bore 132.

In one or more examples, the method 300 includes comparing 330 the amplitude response of the mechanical fastener 160 at the plurality of frequencies 152 to predefined values for the plurality of frequencies 152 to determine whether an out-of-tolerance condition is present. An out-of-tolerance condition may be a function of how aligned the amplitude response of the mechanical fastener 160 at the plurality of frequencies 152 is to predefined values based upon a predetermined tolerance.

In one or more examples, the out-of-tolerance condition is present when a difference between the amplitude response of the mechanical fastener 160 at one frequency of the plurality of frequencies 152 and the predefined value for that one frequency of the plurality of frequencies 152 exceeds a threshold. Still referring to FIG. 2, the method 300 further includes rejecting 340 the fastened structure 120 when the out-of-tolerance condition is present.

In one or more examples, the fastened structure 120 comprises at least two structural members, 122 and 124. In one example, the structural member 122 of the at least two structural members 122 and 124 defines a bore 130 and the second structural member 124 of the at least two structural members 122 and 124 defines a second bore 132. In an example, the mechanical fastener 160 is received in both the bore 130 of the at least one structural member 122 and the second bore 132 of the second structural member 124.

Figure 4A:
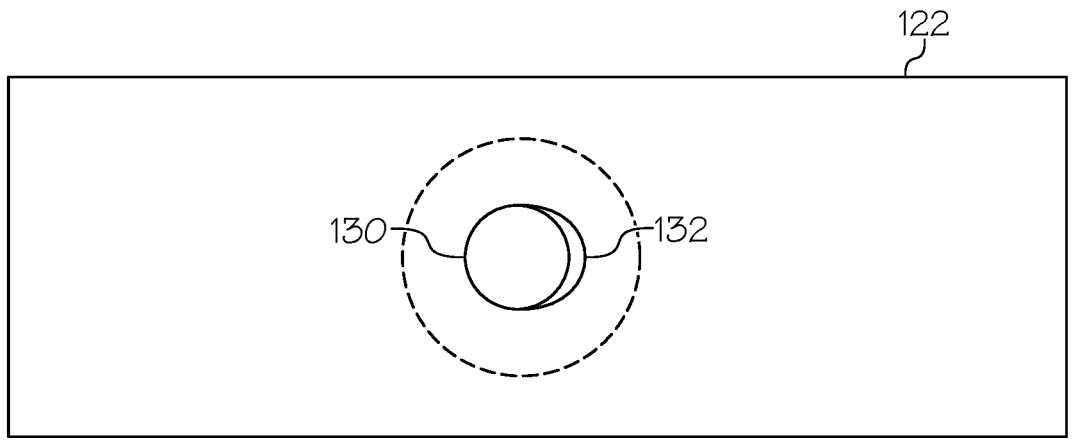
FIG. 4a is a cross-sectional top view of a schematic fastened structure.
Figure 4B:
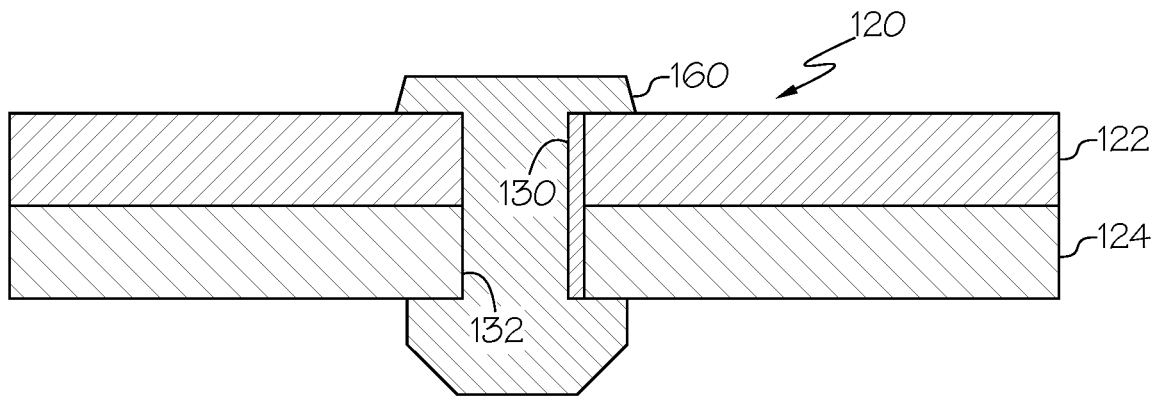

Referring to FIG. 3, disclosed is a system 100 for inspecting a fastened structure 120, the fastened structure 120 comprising at least one structural member 122 defining a bore 130 therein and a mechanical fastener 160 received in the bore 130. The system 100 may be configured to detect the presence of out-of-tolerance conditions, such as cracks in a fastened structure 120, misalignment between bores of the fastened structure 120, see FIG. 4*a* and FIG. 4*b*, or improper torque applied to a mechanical fastener 160 in the fastened structure 120. FIG. 5 illustrates examples of different out-of-tolerance conditions detected due to exemplary conditions Damage 1 and Damage 2.

As illustrated in FIG. 3, the system 100 includes an ultrasound transducer 102 configured to apply acoustic energy 150 to the fastened structure 120 over a plurality of frequencies 152 and measure a response of the fastened structure 120 to the plurality of frequencies 152. In one example, the ultrasound transducer 102 is configured to apply the acoustic energy 150 at frequencies ranging from about 30 kHz to about 1 MHz. In another example, the ultrasound transducer 102 is configured to apply the acoustic energy 150 at frequencies ranging from about 30 kHz to about 250 kHz.

Still referring to FIG. 3, the system 100 includes a processor 104 in communication with the ultrasound transducer 102. The processor 104 is configured to compare the response of the fastened structure 120 to the plurality of frequencies 152 to predefined values for the plurality of frequencies 152 to determine whether an out-of-tolerance condition is present. An out-of-tolerance condition may be present when, for example, the bore 130 and the second bore 132 are misaligned, see FIG. 4*a* and FIG. 4*b*. In another example, an out-of-tolerance condition may be present when the mechanical fastener 160 is not centered in the bore 130 and the second bore 132.

Figure 6:
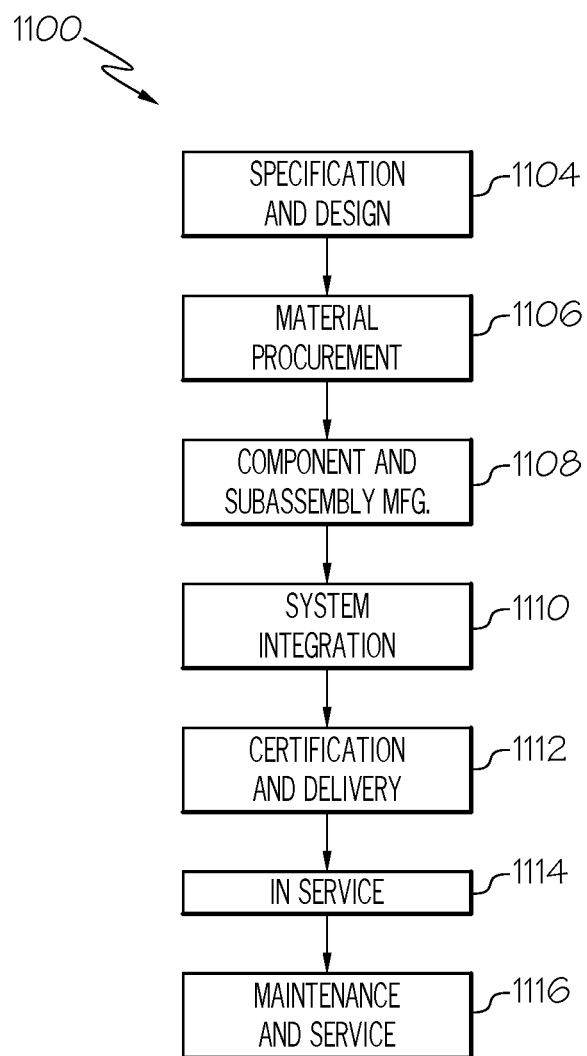
FIG. 6 is a flow chart of aircraft production and service methodology.
Figure 7:
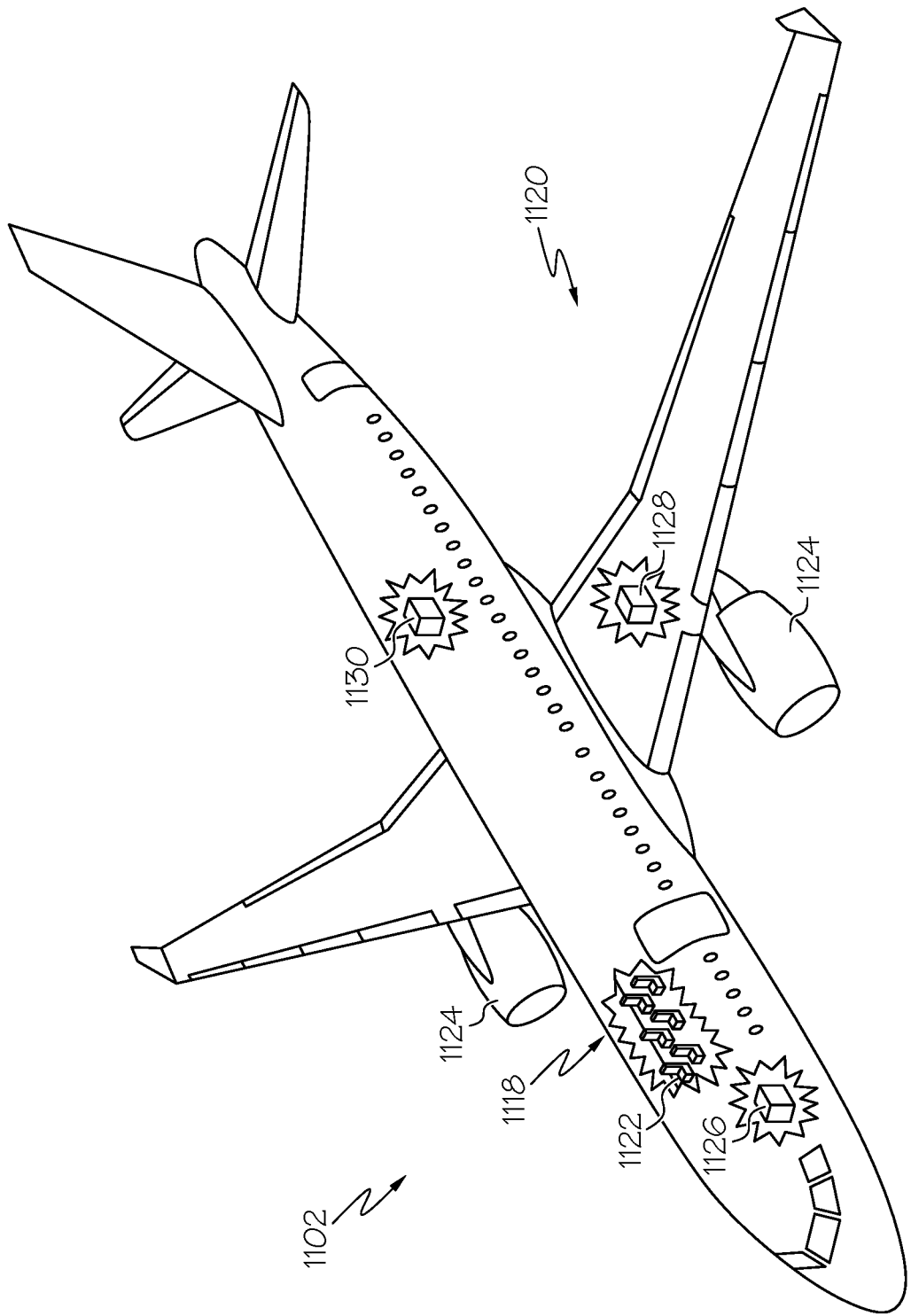
FIG. 7 is a schematic of the aircraft.

Examples of the present disclosure may be described in the context of aircraft manufacturing and service method 1100 as shown in FIG. 6 and aircraft 1102 as shown in FIG. 7. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

System(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the system(s), method(s), or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Different examples of the system (s) and method(s) disclosed herein include a variety of components, features, and functionalities. It should be understood that the various examples of the system (s) and method(s) disclosed herein may include any of the components, features, and functionalities of any of the other examples of the system (s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for inspecting a fastened structure, the fastened structure comprising at least one structural member defining a bore therein and a mechanical fastener received in the bore, the method comprising:
    applying acoustic energy to the fastened structure via an ultrasound transducer to induce acoustic resonance within the mechanical fastener, the acoustic energy being applied over a plurality of frequencies;
    measuring a response of the fastened structure across at least two frequencies of the plurality of frequencies via the ultrasound transducer, the response being indicative of a resonance frequency of the mechanical fastener; and
    comparing the response of the fastened structure at the at least two frequencies of the plurality of frequencies to predefined values for the at least two frequencies of the plurality of frequencies to determine whether the resonance frequency associated with the response is indicative of a predetermined resonance frequency for an out-of-tolerance condition is associated with a defective fastener hole.

2. The method of claim 1, wherein the applying the acoustic energy to the fastened structure comprises applying the acoustic energy to the mechanical fastener.

3. The method of claim 1, wherein the applying the acoustic energy to the fastened structure comprises acoustically coupling a mechanical impedance analysis probe with the fastened structure.

4. The method of claim 1, wherein the applying the acoustic energy to the fastened structure comprises applying the acoustic energy at a frequency ranging from about 30 kHz to about 1 MHz.

5. The method of claim 1, wherein the applying the acoustic energy to the fastened structure comprises applying the acoustic energy at a frequency ranging from about 30 kHz to about 250 kHz.

6. The method of claim 1, wherein the measuring the response of the fastened structure comprises measuring an amplitude response of the fastened structure to the acoustic energy.

7. The method of claim 1, wherein the measuring the response of the fastened structure comprises measuring a phase response of the fastened structure to the acoustic energy.

8. The method of claim 1, wherein both the applying the acoustic energy to the fastened structure and the measuring the response of the fastened structure are performed by a mechanical impedance analysis probe acoustically coupled with the fastened structure.

9. The method of claim 1, wherein the measuring the response of the fastened structure comprises measuring the response of the fastened structure at each frequency of the plurality of frequencies.

10. The method of claim 9, wherein the comparing the response of the fastened structure comprises comparing the response of the fastened structure at each frequency of the plurality of frequencies to predefined values for each frequency of the plurality of frequencies.

11. The method of claim 1, wherein the out-of-tolerance condition is present when a difference between the response of the fastened structure at any of the at least two frequencies of the plurality of frequencies and the predefined values for the at least two frequencies of the plurality of frequencies exceeds a threshold.

12. The method of claim 1, further comprising rejecting the fastened structure when the out-of-tolerance condition is present.

13. The method of claim 1, wherein the fastened structure comprises at least two structural members, wherein at least one structural member of the at least two structural members defines a first bore and a second structural member of the at least two structural members defines a second bore, and wherein the mechanical fastener is received in both the first bore and the second bore.

14. The method of claim 13, wherein the predefined values are indicative of resonance frequencies associated with at least one of the mechanical fastener is not centered in one or more of the first bore and the second bore, a mismatch between the first bore and the second bore, an out-of-round condition for one or more of the first bore and the second bore, a misalignment between the first bore and the second bore and a crack in the fastened structure around the mechanical fastener.

15. The method of claim 1, wherein the structural member of the fastened structure comprises at least one of a metallic material and a composite material.

16. The method of claim 1, wherein the mechanical fastener of the fastened structure comprises at least one of a bolt, a screw, and a rivet.

17. A method for inspecting a fastened structure, the fastened structure comprising at least one structural member defining a bore therein and a mechanical fastener received in the bore, the method comprising:
   acoustically coupling a mechanical impedance analysis probe with the mechanical fastener of the fastened structure to apply acoustic energy to the mechanical fastener and to induce acoustic resonance within the mechanical fastener, the acoustic energy being applied at a plurality of frequencies ranging from about 30 kHz to about 250 kHz;
   measuring an amplitude response of the mechanical fastener at the plurality of frequencies, the amplitude response being indicative of a resonance frequency of the mechanical fastener; and
   comparing the amplitude response of the mechanical fastener at the plurality of frequencies to predefined values for the plurality of frequencies to determine whether the resonance frequency associated with the amplitude response is indicative of a predetermined resonance frequency for an out-of-tolerance condition associated with a defective fastener hole.

18. The method of claim 17, wherein the out-of-tolerance condition is present when a difference between the amplitude response of the mechanical fastener at one frequency of the plurality of frequencies and the predefined value for that one frequency of the plurality of frequencies exceeds a threshold.

19. The method of claim 17, further comprising rejecting the fastened structure when the out-of-tolerance condition is present.

20. A system for inspecting a fastened structure, the fastened structure comprising at least one structural member defining a bore therein and a mechanical fastener received in the bore, the system comprising:
   an ultrasound transducer configured to apply acoustic energy to the fastened structure over a plurality of frequencies to induce acoustic resonance within the mechanical fastener and to measure a response of the fastened structure to the plurality of frequencies, the response being indicative of a resonance frequency of the mechanical fastener; and
   a processor in communication with the ultrasound transducer, the processor being configured to compare the response of the fastened structure to the plurality of frequencies to predefined values for the plurality of frequencies to determine whether the resonance frequency associated with the response is indicative of a predetermined resonance frequency for an out-of-tolerance condition associated with a defective fastener hole.

* * * * *